United States Patent [19]
Phillipp et al.

[11] 3,896,130
[45] July 22, 1975

[54] OCTAHYDROBENZOCYCLOHEP-TAPYRIDOISOQUINOLINE DERIVATIVES AND PROCESS FOR THE PREPARATION THEREOF

[75] Inventors: Adolf H. Phillipp, Montreal; Leslie G. Humber, Dollard Des Ormeaux; Francois T. Bruderlein, Montreal; Manfred K. Gotz, Hudson, all of Canada

[73] Assignee: Ayerst McKenna and Harrison Ltd., Montreal, Canada

[22] Filed: Aug. 4, 1972

[21] Appl. No.: 278,167

[52] U.S. Cl. ............... 260/286 Q; 260/283.5 Y
[51] Int. Cl. ......................................... C07d 33/32
[58] Field of Search ........ 260/283 R, 286 R, 286 Q

[56] References Cited
UNITED STATES PATENTS

| | | | |
|---|---|---|---|
| 3,265,700 | 8/1966 | Brown | 260/286 Q |
| 3,378,561 | 4/1968 | Montzka | 260/286 Q |
| 3,657,250 | 4/1973 | Bruderlein et al. | 260/286 R |

OTHER PUBLICATIONS

Tahk, "The 3-Arylpyrrolidine Alkaloid Synthon," Sept. 1968, 90 JACS 5584.

Morrison and Boyd, "Organic Chemistry," 1967, (Allyn & Bacon, Inc.) pp. 563, 741.

*Primary Examiner*—Donald G. Daus
*Assistant Examiner*—David E. Wheeler
*Attorney, Agent, or Firm*—John W. Routh; John P. Floyd

[57] ABSTRACT

Octahydrobenzo[6,7]cyclohepta[1,2,3-de]pyrido[2,1-a]-isoquinolines optionally substituted at position 4 as well as positions 7 to 9 inclusive and 12 to 15 inclusive are disclosed. The compounds are prepared by a process which involves a condensation between an alkali metal salt of a 3-methyl-1,7,8,12b-tetrahydrobenzo[1,2]cyclohepta[3,4,5-de]isoquinoline derivative and an appropriate propane compound having suitable leaving groups, for example, halogen, methylsulfonyloxy, phenylsulfonyloxy and p-toluenesulfonyloxy, at the $\alpha$ and $\gamma$ position thereon. The compounds have useful pharmacologic and chemotherapeutic properties. Methods for their use are given.

1 Claim, No Drawings

OCATHYDROBENZOCYCLOHEP-TAPYRIDOISOQUINOLINE DERIVATIVES AND PROCESS FOR THE PREPARATION THEREOF

BACKGROUND OF THE INVENTION

1. Field of the Invention

This invention relates to benzocycloheptapyridoisoquinoline derivatives, to a new method for preparing the same and to intermediates used in the preparation of these derivatives.

More specifically, this invention discloses a process for preparing a class of octahydrobenzo[6,7]cyclohepta[1,2,3-de]pyrido[2,1-a]isoquinoline derivatives having valuable pharmacologic properties.

2. Description of the Prior Art

A number of the compounds which are prepared by the process of this invention have been described previously in U.S. Pat. No. 3,657,250, issued Apr. 18, 1972 and prepared therein by alternate processes; for example, 1,4,5,6,6a,10,11,15b-octahydro-3H-benzo[6,7]cyclohepta[1,2,3-de]pyrido[2,1-a]isoquinoline, the parent compound of formula I, herein, wherein $R^1$, $R^2$, $R^3$, and $R^4$ are hydrogen.

Notwithstanding, the processes disclosed in the preceding patent, the present invention discloses a new method for preparing this valuable class of compounds. The present method offers the desirable features of a minimal number of operations, economy and efficiency, Furthermore, the present method may be extended to prepare previously undisclosed derivatives of the benzocycloheptapyridoisoquinoline class.

The process by which the above desirable results are obtained involves an unique fusion of a new ring to an existing ring system to obtain derivatives having a pyrido[2,1-a]isoquinolinium system. By the appropriate choice of conditions the latter derivatives are then reduced stereospecifically to give the desired compounds of this invention in one isomeric form or the other. Accordingly, the direct formation of the above pyrido[2,1-a]isoquinolinium system is most desirable and also noteworthy in the light of the report by D. A. EVans, J. Amer. Chem. Soc., 92, 7593 (1970), that several types of cyclic imines lead to derivatives with enamine systems when subjected to somewhat analogous conditions.

SUMMARY OF THE INVENTION

The benzocycloheptapyridoisoquinoline derivatives of this invention are represented by formula I

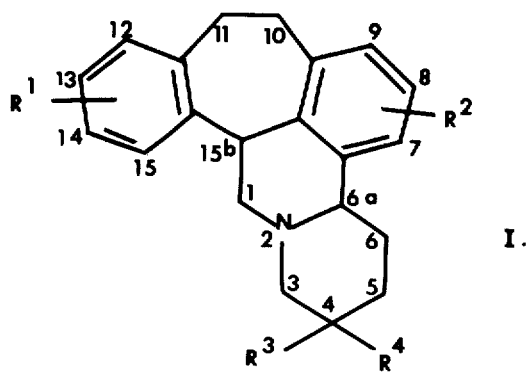

in which $R^1$ and $R^2$ are the same or different selected from the group consisting of hydrogen, lower alkyl, lower alkoxy, trifluoromethyl and halo; $R^3$ is hydrogen or lower alkyl and $R^4$ is hydrogen or hydroxy; or $R^3$ and $R^4$ together represent oxo.

The process of this invention may be represented schematically in the following manner.

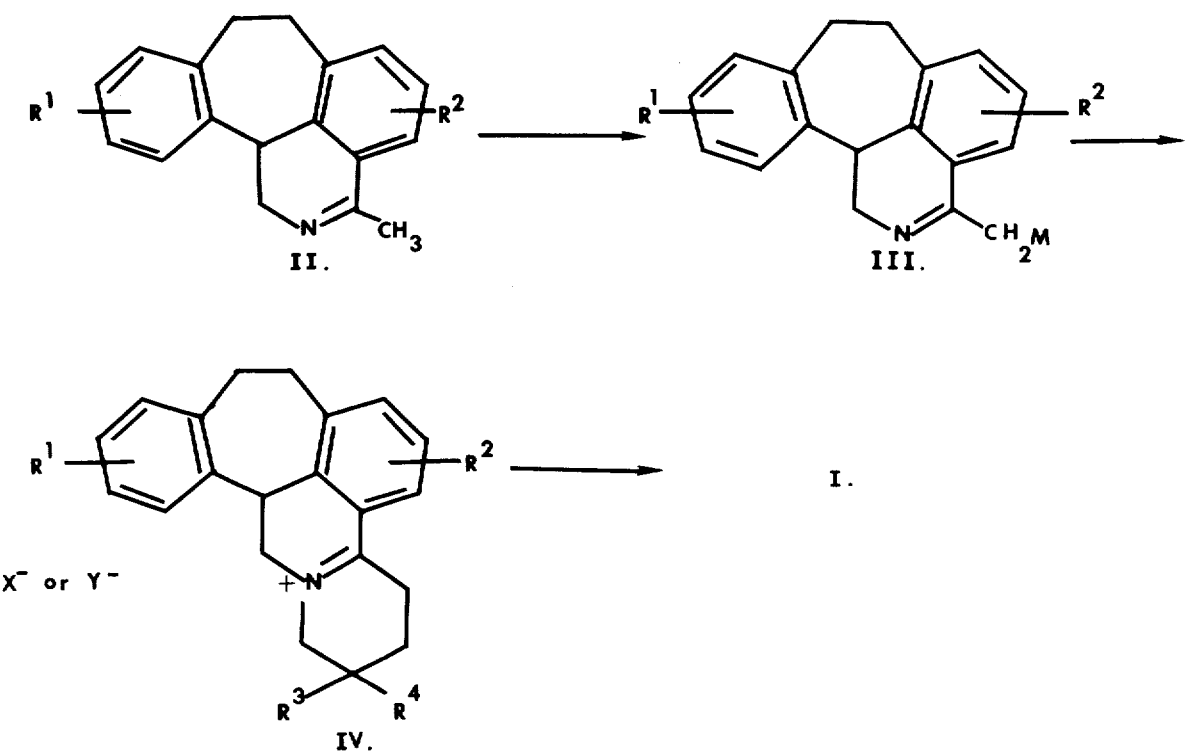

More specifically, the preparation of the benzocycloheptapyridoisoquinoline of this invention may be achieved by the above process comprising converting a compound of formula II in which $R^1$ and $R^2$ are as defined hereinbefore to its corresponding alkali metal derivative of formula III in which $R^1$ and $R^2$ are as defined hereinbefore and M is an alkali metal selected from the group consisting of lithium, sodium or potassium. The alkali metal derivative is then condensed with a compound of formula $XCH_2CR^3R^4CH_2Y$ in which X and Y are the same or different selected from the group consisting of chlorine, bromine, iodine, methylsulfonyloxy, phenylsulfonyloxy and p-toluenesulfonyloxy, $R^3$ is hydrogen or lower alkyl and $R^4$ is hydrogen or a protected hydroxyl of formula $OR^5$ in which $R^5$ is a hydroxy protecting radical selected from the group consisting of acid liable protecting radicals, for example, tetrahydropyran-2-yl, (α-ethoxy)ethoxy, t-butyl, trityl, acetyl, p-methoxybenzyl and the like; alkaline liable protecting radicals, for example acetyl, propionyl and the like and catalytic hydrogen liable protecting group, for example, benzyl, methoxybenzyl and the like; or $R^3$ and $R^4$ together represent an oxo protecting radical, preferably an alkylenedioxy radical containing from two to four carbon atoms, for example ethylenedioxy, to obtain the isoquinolinium compound of formula IV in which $R^1$, $R^2$, X and Y are as defined hereinbefore and $R^3$ and $R^4$ are as defined in the last instance. Thereafter, the isoquinolinium compound is treated with either a. a reducing agent selected from the group consisting of alkali metal borohydride, Raney nickel or hydrogen in the presence of Raney nickel or a noble metal catalyst to give the corresponding compound of formula I in which $R^1$ and $R^2$ are as defined hereinbefore and $R^3$ and $R^4$ are as defined in the last instance; thereafter, when it is desired to obtain the compound of formula I in which $R^3$ is hydrogen or lower alkyl and $R^4$ is hydroxy or $R^3$ and $R^4$ together are oxo, the last-named compound of formula I in which $R^4$ is a protected hydroxyl of formula $OR^5$ in which $R^5$ is as defined herein or the last-named compounds of formula I in which $R^3$ and $R^4$ together represent an oxo protecting alkylenedioxy as defined herein, are subjected to conditions to remove said protecting groups, preferably by hydrolysis under acidic conditions, to give the desired, corresponding compounds of formula I, respectively, with the proviso that when $R^5$ of said isoquinolinium compound is liable to hydrogenolysis, then said treatment thereof with hydrogen and Raney nickel or a noble metal catalyst gives directly the aforementioned corresponding compounds of formula I in which $R^5$ is hydrogen, or b. a metal-acid reducing agent and, if required, followed by treatment under conditions to remove said protecting groups, to yield the corresponding compound of formula I in which $R^1$ and $R^2$ are as defined herein and $R^3$ and $R^4$ are as defined in the first instance.

It is to be understood that the aforementioned protecting radical $R^5$ need not necessarily be limited to the selection of an acid liable protecting group. Indeed it will be apparent that the selection of an $R^5$ radical which is acid liable, alkaline liable or catalytic hydrogen liable falls within the scope and spirit of the present invention and that the only limitation that should be imposed on this group is that it be stable to the conditions of the condensation.

In another aspect of this invention, an above compound of formula I in which $R^3$ is hydrogen and $R^4$ is hydroxyl is treated with an oxidizing agent to give the corresponding compound of formula I in which $R^3$ and $R^4$ together are oxo. Thereafter and if desired, the latter compound is treated with a lower alkyl magnesium halide or lower alkyl lithium to give the corresponding compound of formula I in which $R^3$ is lower alkyl and $R^4$ is hydroxy.

DESCRIPTION OF THE PREFERRED EMBODIMENT OF THE INVENTION

The benzocycloheptapyridoisoquinoline derivatives of this invention form acid addition salts pharmaceutically acceptable acids. Such acid addition salts are included within the scope of this invention.

Acid addition salts are prepared by reacting the base form of the appropriate compound of formula I with either one equivalent or preferably with an excess of an appropriate acid in an organic solvent, for example, ether or an ethanol-ether mixture. Such salts may be used for the purpose of isolating and/or purifying the compounds of this invention and may be transformed in a known manner to the corresponding salts of pharmaceutically acceptable acids. The acid addition salts with pharmaceutically acceptable acids, when administered to mammals, possess the same pharmacologic activities as the corresponding bases. For many purposes it is preferable to administer the salts rather than the base compounds. Among the acid addition salts suitable for this purpose are salts such as the sulfate, phosphate, lactate, tartrate, maleate, citrate hydrobromide and hydrochloride. Both the base compounds and the salts have the distinct advantage of possessing a relatively low order of toxicity.

Also included in this invention are the stereochemical isomers of the compounds of formula I which result from asymmetric centers, contained herein. These isomeric forms may be prepared by different methods and are purified readily by crystallization or chromatography.

Individual optical isomers, which might be separated by fractional crystallization of the diastereoisomeric salts formed thereof, for instance, with d- or l-tartaric acid or D-(+)-α-bromocamphor sulfonic acid, are also included.

The term "lower alkyl" as used herein contemplates straight chain alkyl radicals containing from 1 to 6 carbon atoms and branched chain alkyl radical containing up to four carbon atoms and includes methyl, ethyl, propyl, isopropyl, butyl, isobutyl, and the like.

The term "lower alkoxy" as used herein contemplates both straight and branched chain alkoxy radicals containing from 1 to 4 carbon atoms and includes methoxy, ethoxy, isopropoxy, t-butoxy and the like.

The term "halo" as used herein contemplates halogens and includes fluorine, chlorine, bromine and iodine.

As mentioned before, certain compounds within the class of the benzocycloheptapyridoisoquinoline derivatives of the present invention have been disclosed previously in U.S. Pat. No. 3,657,250, cited above. More particularly, the compounds of formula I in which $R^1$, $R^2$ and $R^4$ are hydrogen and $R^3$ is hydrogen or lower alkyl and the acid addition salts and isomers thereof, are disclosed in said patent along with a detailed description of their pharmacologic properties and methods for their use. Likewise the remaining compounds of formula I of the present invention and their corresponding acid addition salts and isomers thereof have like pharmacologic properties and utilities. In addition the compounds of formula I of the present invention have been found to possess antifungal activity against a number of pathogenic fungi such as, Candida albicans, Microsporum gypseum and Trichophyton granulosum, is standard tests for antifungal activity, such as those described in "Antiseptics, Disinfectants, Fungicides and Sterilization", G. F. Reddish, Ed., 2nd ed., Lea and Febiger, Philadelphia, 1957 or by D. C. Grove and W. A. Randall in "Assay Methods of Antibiotics", Med. Encycl. Inc., New York 1955.

For example, by employing a test like the serial broth dilution, see Grove and Randall, cited above, in which dilutions of the compounds of this invention in nutrient broth are inoculated with the fungi, described above, incubated at 37°C for 2 days, respectively, and examined for the presence of growth, it may be shown that 1,4,5,6,6a,10,11,15b-octahydra-3H-benzo[6,7]cyclohepta[1,2,3-de]pyrido[2,1-a]isoquinolin-4-ol hydrochloride (Isomer A) inhibits totally the growth of Microsporum gypseum and Trichophyton granulosum at 62.5 mcg/ml or better (see below for an explanation of the term, Isomer A).

When the compounds of this invention are employed as antifungal agents in warm-blooded animals, e.g., rats, alone or in combination with pharmacologically acceptable carriers, the proportion of which is determined by the solubility and chemical nature of the compound, chosen route of administration and standard biological practice. For example, they may be administered orally in solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration levele that will generally afford effective results without causing any harmful or deleterious side effects and preferably at a level that is in a range of from about 0.5 mg to about 500 mg per kilo per day, although as aforementioned variations will occur. However, a dosage level that is in the range of from about 1.0 mg to about 50 mg per kilo per day is most desirably employed in order to achieve effective results.

In addition, the agent may be employed topically. For topical application they may be formulated in the form of solutions, creams, or lotions in pharmaceutically acceptable vehicles containing 0.1–5 percent, preferably, 2 percent of the agent and may be administered topically to the infected area of the skin.

Also the antifungal properties of the compounds of formula I may be utilized for washing equipment in hospitals, homes and farms, instruments used in medicine and bacteriology, clothing used in bacteriological laboratories, and floors, walls and ceiling in rooms in which a background free of pathogenic fungi such as those listed above is desired. When employed in this manner the compounds of this invention may be formulated in a number of compositions comprising the active compound and an inert material. In such compositions, while the compounds of formula I of this invention may be employed in concentrations as low as 1000 p.p.m., from a practical point of view, it is desirable to use from about 0.10% by weight to about 5% by weight or more. In particular, in useful compositions for use as washing solutions, the active compounds of this invention may be used generally in the range of from 0.5% to 2.5% by weight. isoquinolin- The formulations that may be used to prepare wash solutions of the compounds of this invention are varied and may readily be accomplished by standard techniques, see for example, "Remington's Pharmaceutical Sciences", A. Osol, et al., Eds., 14th ed., Mack Publishing Company, Easton, Penn., 1970, pp. 1478–1500. In general, the compounds may be made up in stock solutions. They can also be formulated as suspensions in an aqueous vehicle. These make useful mixtures to decontaminate premises. Alsos, aqueous vehicles containing emulsifying agents, such as sodium lauryl sulfate, and relatively high concentrations, e.g., up to about 5% by weight, of the compounds may be formulated by conventional techniques. A typical antiseptic preparation useful for disinfecting floors, walls, ceiling and articles in a contaminated room may be prepared by adding 5 to 25 g of 1,4,5,6,6a,10,11,15b-octahydro-3H-benzo[6,7]cyclohepta[1,2,3-de]pyrido[2,1a]-isoquinolin-4-ol hydrochloride (Isomer A) to a mixture of 150 to 300 g of polyethylene glycol 1540 and 150 to 300 g of polyethylene glycol 300. The resulting mixture is stirred while a solution of 1 to 10 g of sodium lauryl sulfate in 300 to 400 ml of water is added portionwise. The article to be disinfected is coated or immersed in the preparation for a prolonged time, for example, 1 hour and then rinsed with sterile water.

Process

The requisite starting materials of formula II are described or prepared by the procedure described in U.S. Pat. No. 3,403,157, issued Sept. 24, 1968.

The first step of the present process is based on the finding that a hydrogen atom of the methyl group on the nitrogen containing ring of the compounds of formula II readily exchanges with an alkali metal cation to give the corresponding alkali metal salt of formula III; for example, the corresponding lithium, potassium or sodium salt.

The lithium salt of the compound of formula III is obtained readily by treating the compound of formula II with at least one equivalent of a suitable organolithium reagent in an inert solvent. Suitable organolithium reagents include n-butyl lithium,, n-propyl lithium, benzyllithium, phenyl lithium and the like, and suitable inert solvents include ether, tetrahydrofuran, hexane and the like.

The reaction time may be varied, for example, from 15 minutes to 6 hours, depending on the particular starting material of formula II and the organolithium reagent used; likewise, the temperature employed may be varied. In practice, the compound of formula II is usually dissolved in the inert solvent and the solution cooled to between −80°C and 0°C. The bath temperature of a mixture of acetone and dry ice (ca −78°C) is a convenient temperature to initiate this reaction. Under the latter conditions treatment of the compound of formula II in tetrahydrofuran with an equimolar amount of n-butyllithium in hexane for one hour converts the compound to its corresponding lithium salt of formula III.

The sodium or potassium salts of formula III are obtained by treating the appropriate compound of formula II with sodium or potassium amide in an inert solvent. The ranges of the temperature and times for these conversions may be varied since ordinarily the conversion begins to proceed on mixture of the reactants. The temperature range of −50°C to 20°C and the time range of from 30 minutes to 24 hours are practical and convenient in this case. Preferred conditions include treating the starting material of formula II with at least a molar equivalent of potassium or sodium amide in an inert solvent, for example, liquid ammonia, tetrahydrofuran, hexane at −33°C to 0°C for about 1 to 2 hours.

At this point the alkali metal salt may be isolated; however, it is generally more convenient and practical to use the prepared solution of the alkali salt in an inert aprotic solvent in the following condensation step.

The condensation step of the present preferred embodiment is performed by treating the alkali metal salt of formula III with a propane compound of formula $XCH_2CR^3R^4CH_2Y$ in which X and Y are as defined hereinbefore and $R^3$ is hydrogen or lower alkyl and $R^4$ is hydrogen or a protected hydroxyl of formula $OR^5$ in which $R^5$ is an acid liable protecting radical as defined above, or $R^3$ and $R^4$ together represent an alkylenedioxy as defined above to yield the isoquinolinium compound of formula IV in which $R^1$, $R^2$, X and Y are as defined in the first instance and $R^3$ and $R^4$ are as defined in the last instance.

More specifically, the condensation is performed by bringing the propane compound into contact with the appropriate alkali metal salt of formula III, in an inert solvent, preferably the inert solvent in which the salt of formula III was prepared. Times and temperatures for this condensation may be varied. Generally a reaction time of one to 24 hours and a temperature range of from −80° to 20°C may be employed. In a preferred embodiment of this condensation the lithium derivative of formula III in tetrahydrofuran, cooled to 78°C (acetone-dry ice bath temperature) is treated with the appropriate propane compound; thereafter, the reaction mixture is gradually allowed to rise to 20°C over a period of from 6 to 24 hours. At the point the desired isoquinolinium compound of formula IV usually precipitates from the reaction and is collected by filtration. In case the expected precipitate does not occur readily, it is advantageous to heat the reaction mixture to reflux for 1 to 2 hours to complete the reaction and to promote precipitation. Thereafter, dilution of the reaction mixture with a non-polar solvent usually causes the quinolinium compound to separate completely from the mixture and allows isolation of the quinolinium compound by conventional means such as filtration or decantation.

The propane compounds of formula $XCH_2CR^3R^4CH_2Y$ used in the preceding reaction are either known, for example, 1,3-dibromopropane, or they may be prepared by known methods, for example, see Rodd's "Chemistry of Carbon Compounds", Vol. Ia, S. Coffey, Ed., 2nd. ed., Elsevier Publishing Company, Amsterdam, 1964, pp. 488–499, P. Pfeiffer and K. Bauer, Ber., 80, 7 (1947) or Kling, C.R. Acad. Sci., 137, 756 (1903).

In the next step of this process the isoquinolinium compound of formula IV is reduced in the manner described for the same or similar reductions in U.S. Pat. No. 3,657,250, cited above. More explicitly, the isoquinolinium compound is reduced with either an alkali metal borohydride, in inert solvents, for instance, methanol or water, Raney nickel in an inert solvent, for instance, ethanol or water, or by means of catalytically activated hydrogen, using preferably Raney nickel or a noble metal catalysts, for example, palladium or platinum catalyst, in solvents such as, for example, ethanol, acetic acid or tetrahydrofuran, to give one isomer of the corresponding compound of formula I in which $R^1$ and $R^2$ are as defined in the first instance and $R^3$ and $R^4$ are as defined in the last instance. For convenience, this isomer is designated as isomer B and is one of the configurational isomers, discussed above.

On the other hand reduction of the isoquinolinium compound of formula IV in the presence of a metal, for example, zinc, tin, amalgamated zinc and the like, with an acid, for example, hydrochloric acid, sulfuric acid and the like, using an appropriate solvent such as ethanol or acetic acid affords the corresponding compound of formula I in which $R^1$ and $R^2$ are as defined herein and $R^3$ and $R^4$ are as defined in the first instance; namely $R^3$ is hydrogen or lower alkyl and $R^4$ is hydrogen or hydroxy; or $R^3$ and $R^4$ together are oxo. In other words, in this preferred embodiment the reduction of the isoquinolinium compounds of formula IV in an acidic reducing medium results in the simultaneous removal of the hydroxy acid liable protecting group or alkylenedioxy group, if present, to yield directly the corresponding isomer A of the benzocycloheptapyridoisoquinoline having a hydroxyl or ketone of the newly formed ring.

Returning to the preceding process for reduction of the isoquinolinium compound of formula IV, in a preferred embodiment when it is desired to obtain the B isomer of the compound of formula I in which $R^4$ is hydroxy or $R^3$ and $R^4$ together are oxo, the corresponding compound of formula I in which $R^4$ is a protected hydroxyl of formula $OR^5$ in which $R^5$ is an acid liable protecting radical or the corresponding isomer B compound of formula I in which $R^3$ and $R^4$ together represent an alkylenedioxy as defined herein, described above, is subjected to hydrolysis under acid conditions whereby the desired B isomer of the compound of formula I is obtained, respectively.

This hydrolysis is conveniently performed by using a mineral acid or a strong organic acid, for example, hydrochloric acid, sulfuric acid, p-toluenesulfonic acid, in the presence of water in a suitable water-miscible solvent, for example, methanol, acetone, ethanol or tetrahydrofuran. Convenient temperatures and times for this hydrolysis include 20° to 100°C and 30 minutes to 24 hours, respectively. Preferred conditions include the use of hydrochloric acid as the acid, acetone as the solvent, a temperature of about 60°C and a time of about 2 hours.

Alternatively, the compounds of formula I in which $R^3$ is lower alkyl and $R^4$ is hydroxy are prepared conveniently in the following manner: A benzocycloheptapyridoisoquinoline of formula I in which $R^3$ is hydrogen and $R^4$ is hydroxy is treated with a suitable oxidizing agent to yield the corresponding ketone of formula I in which $R^3$ and $R^4$ together are oxo. Although a variety of suitable agents are available for transforming a secondary alcohol to a ketone; for example, see C. F. Cullis and A. Fish in "The Chemistry of the Carbonyl Group", S. Patai, Ed., Interscience Publishers, London, New York and Sydney, 1966, p. 79, the employment of triethylamine-sulfur trioxide in dimethylsulfoxide, J. Paukh, J. Amer. Chem. Soc., 89, 5505 (1967), as the oxidizing agent in this case is both convenient and efficient and readily yields the desired ketone. Other oxygenated hexavalent chromium compounds may also be used, for example, sodium chromate, chromium trioxidepyridine complexes, Jones' reagent, and the like. Likewise, acetic anhydride-dimethyl sulfoxide and dicyclohexylcarbodiimide-dimethyl sulfoxide give the expected ketone of formula I in which $R^3$ and $R^4$ together are oxo.

The latter compound is converted thereafter to the compound of formula I in which $R^3$ is lower alkyl and $R^4$ is hydroxy by addition reactions to the newly-formed ketone thereof. Among the preferred methods for effecting such an addition reaction is the procedure whereby the ketone is treated with a lower alkyl magnesium halide according to the conditions of the Grignard reaction. Preferred conditions for this reaction include a temperature range of 0°C to the boiling point of the mixture, a reaction time of 30 minutes to 4 hours and the use of ether or tetrahydrofuran as solvent.

Another preferred procedure for effecting the present conversion involves treating the ketone with a lower alkyl lithium derivative, for example, n-propyl lithium, t-butyl lithium and n-hexyl lithium, by essentially the same technique as employed in the Grignard reaction. Convenient conditions for effecting this latter addition include the use of temperatures ranging from −80° to 0°C, times of 1 to 4 hours, and the employment of aprotic solvents such as hexane, ether, or toluene. In this manner the benzocycloheptapyridoisoquinoline derivatives of formula I in which $R^3$ is lower alkyl and $R^4$ is hydroxy are obtained by the alternative procedure.

The following examples will illustrate further this invention.

EXAMPLE 1

3-Methyl-1,7,8,12b-tetrahydrobenzo[1,2]cyclohepta[3,4,5-de]isoquinoline (II; $R^1$ and $R^2$ = H)

10,11-Dihydro-5H-dibenzo[a,d]cycloheptene-5-methylamine hydrochloride (381 g. 1.467 moles) is suspended in pyridine (2 (.). With stirring, acetic anhydride (300 ml) is added in portions. The clear solution is heated at 60°–80°C on a steam bath for 1.5 hr. then cooled to room temperature. With cooling the excess acetic anhydride is destroyed by addition of water. The mixture is further diluted with water to ca. 3–4 l. and the still clear solution is slowly poured into 8 to 10 l. of stirred cold water. The precipitate is collected on a filter and well washed with water. The residue is dissolved in ethanol, the solution is treated with charcoal, filtered and concentrated. Addition of water yields N-10,11-dihydro-5H-dibenzo[a,d]cyclohepten-5-ylmethyl acetamide as near colourless crystals, m.p. 138°–140°C. The latter material (348 g) is combined with 2.5 kg polyphosphoric acid and the mixture is heated with stirring until all starting material is dissolved. The mixture is then stirred at 150°–155°C for 2.5 hr. The reaction mixture is cooled to 90°C, then water (500 ml) is slowly added with stirring and icewater cooling keeping the temperature at 85°–90°C. After the addition, the mixture is cooled to 60°C. The hot solution (60°C) is added slowly to a stirred mixture of 4 l. of ice water. During the addition (45 minutes) the temperature rises to room temperature. Ice is added until the temperature drops to 5°C, then the precipitate is collected on a filter and washed once with 1 l. of cold water. The precipitate is suspended in water (1.5 l.); benzene (1.5 l.) is added and with stirring a concentrated solution of 225 g. sodium hydroxide in water is added in portions (exothermic reaction). The benzene layer is separated, the aqueous phase washed with benzene and the combined benzene solutions washed with water, dried ($MgSO_4$) and filtered. The filtrate is treated with charcoal, concentrated to ca. 700 ml. volume for crystallization. The resulting crystals are collected and washed with hexane to yield the title compound as a solid, m.p. 132°–134°C.

In a similar manner, other appropriate 10,11-dihydro-5H-dibenzo[a,d]cycloheptene-5-methylamine derivatives are converted to their corresponding 3-methyl-1,7,8,12b-tetrahydrobenzo[1,2]cyclohepta[3,4,5-de]isoquinoline derivatives of formula II; see also U.S. Pat. No. 3,403,157, cited above.

EXAMPLE 2

1,3,4,5,6,10,11,15b-Octahydrobenzo[6,7]cyclohepta[1,2,3-de]pyrido[2,1-a]isoquinolinium bromide-(IV; $R^1$, $R^2$, $R^3$ and $R^4$ = H and X = Br)

To a solution of the Schiff base, 3-methyl-1,7,8,12b-tetrahydrobenzo[1,2]cyclohepta[3,4,5-de]isoquinoline (618 mg. 2.5 mmoles), described in Example 1, in dry tetrahydrofuran (5 ml), n-butyllithium (2.2 M in hexane, 1.13 ml, 2.5 mmoles) is added dropwise with stirring and cooling at −78°C (acetone - dry ice) in a $N_2$ atmosphere. Stirring is continued at −78°C for 1 hr. and at the same temperature the propane compound, 1,3-dibromopropane (0.26 m. 2.5 mmoles), is added in one portion. Stirring at −78°C is continued for 2.5–3 hr. then at room temperature overnight (14 hr.). The resulting precipitate is collected and washed with tetrahydrofuran and then ether to give the title compound, m.p. 200°C.

1,3,4,5,6,10,11,15b-Octahydrobenzo[6,7]cyclohepta[1,2,3-de]pyrido[2,1-a]isoquinolinium chloride, m.p. 205°–207°C, is obtained according to the procedure of this example if 1,3-dibromopropane is replaced by an equivalent amount of 1,3-dichloropropane.

Likewise by replacing 1,3-dibromopropane with 1,3-diiodopropane or 1,3-propanediol dimethanesulfonate, 1,3-propanediol diphenylsulfonate or 1,3-propanediol di-p-toluene sulfonate, 1,3,4,5,6,10,11,15b-octahydrobenzo[6,7]cyclohepta[1,2,3-de]pyrido[2,1-a]isoquinolinium iodide and methanesulfonate, phenylsulfonate and p-toluenesulfonate are obtained, respectively.

Again, according to the procedure of this example other isoquinolinium compounds of formula IV are obtained by replacing 3-methyl-1,7,8,12b-tetrahydrobenzo[1,2]cyclohepta[3,4,5-de]isoquinoline with an equivalent amount of the appropriate starting material of formula II. Examples of typical isoquinolinium compounds prepared in this manner are listed as follows and in Table 1.

7-Methyl-1,3,4,5,6,10,11,15b-octahydrobenzo[6,7]cyclohepta[1,2,3-de]pyrido[2,1-a]isoquinolinium bromide from 3,4-dimethyl-1,7,8,12b-tetrahydrobenzo[1,2]cyclohepta[3,4,5-de]isoquinoline, 8-Ethyl-1,3,4,5,6,10,11,15b-octahydrobenzo[6,7]cyclohepta[1,2,3-de]pyrido[2,1-a]isoquinolinium bromide from 3-methyl-5-ethyl-1,7,8,12b-tetrahydrobenzo[1,2]cyclohepta[3,4,5-de]isoquinoline, and 8,13-Dimethyl-1,3,4,5,6,10,11,15b-octahydrobenzo[6,7]cyclohepta[1,2,3-de]pyrido[2,1-a]isoquinolinium bromide from 3,5,10-trimethyl-1,7,8,12b-tetrahydrobenzo[1,2]cyclohepta[3,4,5-de]isoquinoline.

Table 1

| Starting Material: (Prefix listed below)-3-methyl-1,7,8,12b-tetrahydrobenzo-[1,2]cyclohepta[3,4,5-de]-isoquinoline | Product: (Prefix listed below)-1,3,4,5,6,10,11,15b-octahydrobenzo[6,7]cyclohepta[1,2,3-de]-pyrido[2,1-a]isoquinolinium bromide |
|---|---|
| 4-methoxy- | 7-methoxy- |
| 6-ethyl- | 9-ethyl- |
| 4-trifluoromethyl- | 7-trifluoromethyl- |
| 4-chloro- | 7-chloro- |
| 5-propyl- | 8-propyl- |
| 6-t-butoxy- | 9-t-butoxy- |
| 6-trifluoromethyl- | 9-trifluoromethyl- |
| 4,11-difluoro- | 7,14-difluoro- |
| 4,9-di(trifluoromethyl)-12-methyl- | 7,12-di(trifluoromethyl)-15-methyl- |
| 4,12-dichloro- | 7,15-dichloro- |

EXAMPLE 3

1,4,5,6,6a,10,11,15b-Octahydro-3H-benzo[6,7]cyclohepta[1,2,3-de]pyrido[2,1-a]isoquinoline (I: $R^1$, $R^2$, $R^3$ and $R^4$ = H)

Isomer B

The isoquinolinium compound, 1,3,4,5,6,10,11,15b-octahydrobenzo[6,7]cyclohepta[1,2,3-d]pyrido[2,1-a]isoquinolinium bromide (200 mg, 0.543 mmoles), described in Example 2, is heated under reflux with sodium borohydride (200 mg) in methanol for 1 hr. The methanol is removed under reduced pressure. The residue is mixed with water and the mixture extracted with benzene. The extract is washed with water, dried (MgSO₄) and concentrated to dryness. The residue is recrystallized from benzene-n-pentane to give the title compound, isomer B, m.p. 134°–136°C; m.p. of the corresponding hydrochloric acid addition salt is 235°–236°C.

Isomer A

Treatment of the preceding isoquinolinium bromide (2.0 g) with zinc dust (4.0 g) in 40 ml of concentrated HCl and 150 ml of ethanol on the steam bath for one hr., followed by removal of the alcohol under reduced pressure, neutralization with ammonium hydroxide, and extraction with benzene affords the A isomer of the title compound, m.p. 90°–92°C when recrystallized from hexane. The corresponding hydrochloric acid addition salt has m.p. 255°–260°C after crystallization from acetone.

In the same manner the A and B isomers of benzocycloheptapyridoisoquinolines of formula I in which $R^3$ and $R^4$ are hydrogen and $R^1$ and $R^2$ are as defined in the first instance are obtained by replacing 1,3,4,5,6,10,11,15b-octahydrobenzo[6,7]cyclohepta[1,2,3-de]pyrido[2,1-a]isoquinolinium bromide with an equivalent amount of the appropriate corresponding isoquinolinium compound in which $R^1$ and $R^2$ are as defined in the first instance and $R^3$ and $R^4$ are hydrogen. Examples of typical benzocycloheptapyridoisoquinolines prepared in this manner are listed as follows:

7-methyl-1,4,5,6,6a,10,11,15b-octahydro-3H-benzo[6,7]cyclohepta[1,2,3-de]pyrido[2,1-a]isoquinoline, 8-ethyl-1,4,5,6,6a,10,11,15b-octahydro-3H-benzo[6,7]cyclohepta[1,2,3-de]pyrido[2,1-a]isoquinoline, 8,13-dimethyl-1,4,5,6,6a,10,11,15b-octahydro-3H-benzo[6,7]cyclohepta[1,2,3-de]pyrido[2,1-a]isoquinoline, 7-methoxy-1,4,5,6,6a,10,11,15b-octahydro-3H-benzo[6,7]cyclohepta[1,2,3-de]pyrido[2,1-a]isoquinoline, 9-ethyl-1,4,5,6,6a,10,11,15b-octahydro-3H-benzo[6,7]cyclohepta[1,2,3-de]pyrido[2,1-a]isoquinoline, 7-trifluoromethyl-1,4,5,6,6a,10,11,15b-octahydro-3H-benzo[6,7]cyclohepta[1,2,3-de]pyrido[2,1-a]isoquinoline, 7-chloro-1,4,5,6,6a,10,11,15b-octahydro-3H-benzo[6,7]cyclohepta[1,2,3-de]pyrido[2,1-a]isoquinoline, 8-propyl-1,4,5,6,6a,10,11,15b-octahydro-3H-benzo[6,7]cyclohepta[1,2,3-de]pyrido[2,1-a]isoquinoline, 9-t-butoxy-1,4,5,6,6a,10,11,15b-octahydro-3H-benzo[6,7]cyclohepta[1,2,3-de]pyrido[2,1-a]isoquinoline, 9-trifluoromethyl-1,4,5,6,6a,10,11,15b-octahydro-3H-benzo[6,7]cyclohepta[1,2,3-de]pyrido[2,1-a]isoquinoline, 7,14-difluoro-1,4,5,6,6a,10,11,15b-octahydro-3H-benzo[6,7]cyclohepta[1,2,3-de]pyrido[2,1-a]isoquinoline, 8-propyl-13-methoxy-1,4,5,6,6a,10,11,15b-octahydro-3H-benzo[6,7]cyclohepta[1,2,3-de]pyrido[2,1-a]isoquinoline

EXAMPLE 4

4-Hydroxy-1,3,4,5,6,10,11,15b-Octahydrobenzo[6,7-]cyclohepta [1,2,3-de]pyrido[2,1-a]isoquinolinium iodide Tetrahydropyran-2-yl-Ether (IV: $R^1$, $R^2$ and $R^3$ = H and $R^4$ = tetrahydropyranyloxy)

To a solution of the Schiff base, 3-methyl-1,7,8,12b-tetrahydrobenzo[1,2]cyclohepta[3,4,5-de]isoquinoline (74.2 g, 0.3 mole), dissolved in dry freshly distilled THF, n-butyl lithium (130.5 ml, 0.3 mole) 2.3 molar solution in hexane) is added (syringe) with stirring during 10 minutes (N₂-atmosphere), keeping the reaction temperature at −65° to −70°C during the addition. The reaction mixture is stirred at −75°C (acetone-dry ice bath) for 2 hr. 3-Chloro-1-iodopropanol tetrahydropyran-2-yl ether (91.5 g, 0.3 mole) described below, is added neat within 5 minutes at a rate keeping the reaction temperature below −50°C. Stirring of the mixture at −75°C is continued for 2.5 hr, then allowed to reach room temperature and slowly heated to reflux temperature, during which time a precipitate forms. Heating at reflux is continued for one hr, then the mixture is cooled to room temperature. The precipitate is collected on a filter, washed with cold (−20°C) THF and dried to give the title compound m.p. 207°–209°C, $\nu_{max}^{Nujol}$ 1642, 1110, 980 cm$^{-1}$.

The 3-chloro-1-iodopropanol tetrahydropyran-2-yl ether employed in this example is readily obtained by treating 3-chloro-1-iodopropanol (457 g), described by Kling, C. R. Acad, Sci., 137, 756 (1903) [Beilstein 1 (I-186) 366 (1910)], with an excess of dihydropyran (4 moles, 235 g) and 0.2 ml concentrated hydrochloric acid at 0°C with stirring. After standing overnight at room temperature the reaction mixture is diluted with water and extracted with ether. The ether extract is washed with aqueous sodium bicarbonate and water, dried and taken to dryness under reduced pressure between 20°–40°C. The oily residue is subjected to chromatography either on aluminum oxide (Activity II, neutral) and the product eluted with benzene, or on silica gel and elution of the product with benzene-ethyl acetate (95:5). The solvent is removed from the product under reduced pressure at 20°–40°C to give the title compound, nmr (CDCl$_3$): δ1.67 (6H), 3.46 (m, 2H), 3.73 (m,5H), 4.80 (m, 1H), b.p. 90°C at 0.1 mm.

The procedure of this example and Example 2 is used to prepare other isoquinolinium compounds of formula IV by replacing 3-methyl-1,7,8,12b-tetrahydrobenzo[1,2]cyclohepta[3,4,5-de]isoquinoline with an equivalent amount of the appropriate starting material of formula II and using an equivalent amount of the appropriate propane compound for example, 2,2-bischloromethyldioxolane, Pfeiffer and Bauer, cited above, 3-chloropropyl p-toluenesulfonate, H. Gilman and N. J. Beaber, J. Amer. Chem. Soc. 45, 839 (1923), 1-bromo-3-chloropropane and the like. Additional typical examples prepared by this procedure include:

4,4-ethylenedioxy-1,3,4,5,6,10,11,15b-octahydrobenzo[6,7]cyclohepta[1,2,3-de]pyrido[2,1-a]isoquinolinium chloride,
4-hydroxy-7-methyl 1,3,4,5,6,10,11,15b-octahydroben-zo[6,-
7]cycloheptal[1,2,3-de]pyrido[2'']isoquinolinium bromide 4-tetrahydropyran-2-yl ether,
4,4-ethylenedioxy-8,13-dimethyl-1,3,4,5,6,10,11,15b-octahydrobenzo[6,7]cyclohepta-[1,2,3-de]pyrido[2,1-a]isoquinolinium chloride,
4-hydroxy-7-methoxy-1,3,4,5,6,10,11,15b-octahydroben-zo[6,-

]cyclohepta[1,2,3-de]pyrido[2,1-a]isoquinolinium bromide 4-tetrahydropyran-2-yl ether,
7-chloro-4,4-ethylendioxy-1,3,4,5,6,10,11,15b-octahydrobenzo[6,7]cyclohepta[1,2,3-de]pyrido[2,1-a]isoquinolinium chloride,
4-hydroxy-9-trifluoromethyl-1,3,4,5,6,10,11,15b-octahydrobenzo[6,7]cyclohepta[1,2,3-de]pyrido[2,1-a]isoquinolinium bromide 4-tetrahydropyran-2-yl ether,
4-hydroxy-4-propyl-1,3,4,5,6,10,11,15b-octahydroben-zo[6,-

]cyclohepta[1,2,3-de]pyrido[2,1-a]isoquinolinium bromide 4-tetrahydropyran-2-yl ether.

EXAMPLE 5

1,4,5,6,6a,10,11,15b-Octahydro-3H-benzo[6,7]cycloheptal[1,2,3-de]pyrido[2,1-a]isoquinoline-4-ol (1: R$^1$, R$^2$ and R$^3$ = H and R$^4$ = OH)

Isomer B

The isoquinolinium compound, 4-hydroxy-1,3,4,5,6,10,11,15b-octahydrobenzo[6,7]cyclohepta[1,2,3-de]pyrido[2,1-a]isoquinolinium iodide tetrahydropyran-2-yl ether (21.2g, 0.0411 mole), prepared as described in Example 4, is suspended in methanol (350 ml) and sodium borohydride (6 g) is added. The mixture is heated at reflux for 0.5 hr. Most of the methanol is removed under reduced pressure, water is added to the residue and the resulting mixture is extracted with benzene. The benzene solution is washed with water, dried (MgSO$_4$) and taken to dryness to give the tetrahydropyranyl thereof the title compound as a yellow paste. This material is suitable for subsequent conversion to the corresponding desired benzocycloheptapyridoisoquinoline of this invention without further purification; and analytical sample of this material is prepared by crystallization of the crude material from acetone to give 1,4,5,6,6a,10,11,15b-octahydro-3H-benzo[6,7]cyclohepta[1,2,3-de]pyrido[2,1-a]isoquinolin-4-ol tetrahydropyran-2-yl ether as colourless needles, m.p. 150°–153°C.

The above tetrahydropyranyl ether (16.9 g) is mixed with acetone (200 ml), water (50 ml) and conc. HCl (2 ml). The mixture is heated at reflux for 20 minutes. Acetone is removed under reduced pressure. The residue is taken up in chlorofom. The mixture is rendered basic with sodium bicarbonate and extracted with chloroform. The chloroform extract is washed with water, dried (MgSO$_4$) and taken to dryness to yield a yellow paste which crystallized from ether to give the title compound, isomer B, m.p. 160°–162°C., $\nu_{max}^{CHCl_3}$ 3600, 3440 cm$^{-1}$.

The corresponding hydrochloric acid addition salt of the latter compound has m.p. 262°–264°C, $\nu_{max}^{Nujol}$ 3250, 2410 cm$^{-1}$.

Isomer A

The isoquinolinium compound, 4-hydroxy-1,3,4,5,6,10,11,15b-octahydrobenzo[6,7]cyclohepta[1,2,3-de]pyrido[2,1-a]isoquinolinium iodide tetrahydropyran-2-yl ether (103.5 g, 0.20 mole), described in Example 4, is suspended in ethanol (500 ml) and aqueous HCl (1:1, 750 ml). Zinc dust (103 g) is added in portions and the mixture heated at reflux with stirring for 3 hr. The solution is decanted from a small residue and the ethanol distilled under reduced pressure. The residue is taken up in benzene. With stirring and cooling the mixture is rendered basic with conc. ammonium hydroxide. The benzene solution is washed with water, dried and taken to dryness to give a yellow solid which is a mixture of isomers B, described above, and isomer A. Chromatography on silica gel and subsequent elution with benzene-ethyl-acetate (4:1) allows separation of these two isomers; isomer B being eluted first followed by isomer A. Isomer A of the title compound has $\nu_{max}^{CHCl_3}$ 3600 cm$^{-1}$, nmr (CDCl$_3$)δ3.98 (1H), 4.91 (t, 1H). The corresponding hydrochloric acid addition salt of the latter compound has m.p. 253°–258°C.

In the same manner the A and B isomers of other benzocycloheptapyridoisoquinolines of formula I in which R$^1$, R$^2$, R$^3$, and R$^4$ are as defined in the first instance are obtained by using an equivalent amount of the appropriate isoquinolinium compound instead of 4-hydroxy-1,3,4,5,6,10,11,15b-octahydrobenzo[6,7-]cyclohepta[1,2,3-de]pyrido[2,1-a]isoquinolinium iodide tetrahydropyran-2-yl ether. More specifically, 4,4-ethylenedioxy-1,3,4,5,6,10,11,15b -octahydro[6,7]cyclohepta[1,2,3-de]pyrido[2,1-a]isoquinolinium chloride and the succeeding isoquinolinium compounds listed in Example 4 give, according to the procedure of this example, the following respective benzocycloheptapyridoisoquinolines of formula I.

4-Oxo-1,4,5,6,6a,10,11,15b-octahydro-3H-benzo[6,-
7]cyclohepta[1,2,3-de]pyrido[2,1-a]isoquinoline; isomer B has m.p. 197°–200°C after recrystallization from chloroform-methanol, isomer A has m.p. 162°–164°C after recrystallization from benzene.

7-Methyl-1,4,5,6,6a,10,11,15b-octahydro-3H-benzo[6,7]cyclohepta[1,2,3-de]pyrido[2,1-a]isoquinolin-4-ol, 8,13-Dimethyl-4-oxo-1,4,5,6,6a,10,11,15b-octahydro-3H-benzo[6,7]cyclohepta[1,2,3-de]pyrido[2,1-a]isoquinoline.

7-Methoxy-1,4,5,6,6a,10,11,15b-octahydro-3H-benzo[6,7]cyclohepta[1,2,3-de]pyrido[2,1-a]isoquinolin-4-ol, 7-Chloro-4-oxo-1,4,5,6,6a,10,11,15b-octahydro-3H-benzo[6,7]cyclohepta[1,2,3-de]pyrido[2,1-a]isoquinoline, 9-Trifluoromethyl-1,4,5,6,6a,10,11,15b-octahydro-3H-benzo[6,7]cyclohepta[1,2,3-de]pyrido[2,1-]isoquinolin-4-ol, and 4-Propyl-1,4,5,6,6a,10,11,15b-octahydro-3H-benzo[6,7]cyclohepta[1,2,3-de]pyrido[2,1-a]isoquinolin-4-ol.

EXAMPLE 6
4-Oxo-1,4,5,6,6a,10,11,15b-octahydro-3H-benzo[6,7]cyclohepta[1,2,3-de]pyrido[2,1-a]isoquinoline (I: R$^1$ and R$^2$ = H and R$^3$ and R$^4$ = O)

Isomer B

To a solution of 1,4,5,6,6a,10,11,15b-octahydro-3H-benzo[6,7]cyclohepta[1,2,3-de]pyrido[2,1-a]isoquinol-4-ol, iosmer B (4.4 g, 14.4 moles), described in Example 5, in dimethylsulfoxide (DMSO) (10 ml) and triethylamine (15 ml, ca. 100 mmoles) a solution of triethylamine sulfurtrioxide (7.84 g, 44.3 mmoles) in DMSO (20 ml) is added in one portion with stirring at room temperature. The reaction mixture is cooled for 10 minutes with cold water, then stirred overnight at room temperature. After pouring the mixture on ice, the brownish precipitate is collected on a filter, washed well with water and dried to give a brown solid. Chromatography of the solid on a column of alumina (Activity II, neutral) and elution of the column with chloroform gave the title compound, isomer B, m.p. 197°–200°C, $\nu_{max}^{CHCl_3}$ 1712 cm$^{-1}$, after recrystallization from chloroform-methanol. This compound is identical to the compound of the same name described in Example 5.

Isomer A

To a solution of 1,4,5,6,6a,10,11,15b-octahydro3H-benzo[6,7]cyclohepta[1,2,3-de]pyrido[2,1-a]isoquinolin4-ol, isomer A, (7.5 g), described in Example 5, in dry DMSO (200 ml), trithylamine (50 ml) followed by triethylamine sulfurtrioxide (18 g) is added with stirring and cooling (ice bath). The mixture is stirred with cooling for 15 minutes then at room temperature for 16 hr. Ice is added and the reaction mixture is diluted with water. The precipitate is collected on a filter, washed well with water and dried to give a brown solid. Chromatography of the solid on a column of alumina (Activity II, neutral) and elution of the column with chloroform gave the title compound, isomer A, m.p. 162°–164°C, $\nu_{max}^{CHCl_3}$ 1712 cm$^{-1}$, after recrystallization from benzene. This compound is identical to the compound of the same name described in Example 5.

In the same manner, using other appropriate benzocycloheptapyridoisoquinolines of formula I in which R$^3$ is hydrogen and R$^4$ is hydrogen, the corresponding A and B isomers of the ketone of formula I in which R$^3$ and R$^4$ together are oxo, are obtained. For example, the A and B isomers of 7-methyl-4-oxo-1,4,5,6,6a,10,11,15b-octahydro-3H-benzo[6,7]cyclohepta[1,2,3-de]pyrido[2,1-a]isoquinoline are obtained in the same manner from the A and B isomers of 7-methyl-1,4,5,6,6a,10,11,15b-octahydro-3H-benzo[6,7]cyclohetpa[1,2,3-de]purido[2,1-a]isoquinol-4-ol and the A and B isomers of 4-oxo-9-trifluoromethyl-1,4,5,6,6a,10,11,15b-octahydro-3H-benzo[6,7]cyclohepta[1,2,3-de]pyrido[2,1-a]isoquinoline are obtained in the same manner from the A and B isomers of 9-trifluoromethyl-1,4,5,6,6a,10,11,15b-octahydro-3H-benzo[6,7]cyclohepta[1,2,3-de]pyrido[2,1-a]isoquinolin-4-ol.

EXAMPLE 7
4-t-Butyl-1,4,5,6,6a,10,11,15b-octahydro-3H-benzo[6,7]cyclohepta[1,2,3-de]pyrido[2,1-a]isoquinolin-4-ol (I: R$^1$ and R$^2$ = H, R$^3$ = t-C$_4$H$_9$ and R$^4$ = OH)

Isomer B

4-Oxo-1,4,5,6,6a,10,11,15b-octahydro-3H-benzo[6,-
7]cyclohepta[1,2,3-de]pyrido[2,1-a]isoquinoline, isomer B, (1.99 g, 6.5 mmoles), described in Example 6, is dissolved with warming in dry toluene (60 ml). In a nitrogen atmosphere the solution is added dropwise to a large excess of t-butyl lithium (30 ml, 2.3 M solution in pentane) with stirring and cooling by an acetone dry-ice bath. After stirring at −78°C for 4 hr. the reaction mixture is kept at 0°C overnight. The excess reagent is destroyed with aqueous ammonium chloride and the mixture extracted with benzene. The benzene extract is washed with water, dried, and taken to dryness. Chromatography of the residue on a column of alumina (Activity II, neutral) and elution of the column with benzene-pet. ether (3:2) and benzene gives the title compound, isomer B, m.p. 205 - 207°C, $\nu_{max}^{CHCl_3}$ 3480 cm$^{-1}$, after recrystallization from chloroform-methanol. The corresponding hydrochloric acid addition salt of the latter compound, 4-t-butyl- 1,4,5,6,6a,10,11,15b-octahydro-3H-benzo[6,7]cyclohepta[1,2,3- de]pyrido[2,1-a]isoquinolin-4ol hydrochloride, isomer B, has m.p. 265°–267°C after recrystallization from methanol-ether.

Isomer A

4-Oxo-1,4,5,6,6a,10,11,15b-octahydro-3H-benzo[6,7]cyclohepta[1,2,3-de]pyrido[2,1-a]isoquinoline, isomer A (860 mg, 2.84 mmoles), described in Example 6, is added neat to t-butyl lithium (15 ml, 2.3 M solution in pentane) at −70°C with stirring under nitrogen. After 1 hr. at −70°C dry toluene (30 ml) is added dropwise and stirring at this temperature is continued for 2 hr. then at room temperature overnight. Aqueous ammonium chloride is added with cooling. The mixture is extracted with benzene. The benzene solution is washed with water, dried and taken to dryness. Chromatography of the residue on a column of alumina (Activity II, neutral) and elution of the column, wit pet. Ether-benzene (2:3) gives the title compound, isomer A, $\nu_{max}$ CHCl$_3$ 3480 cm$^{-1}$, nmr (CDCl$_3$) δ 1.02 (s, 9H), 4.95 (t, J=8, 1H), 6.70–7.30 (m, 7H).

The corresponding hydrochloric acid addition salt of the latter compound, 4-t-butyl-1,4,5,6,6a,10,11,15b-octahydro-3H-benzo[6,7]cyclohepta[1,2,3-de]pyrido[2,1-a]isoquinolin-4-ol hydrochloride, isomer A, has m.p. 237°–242°C.

In the same manner, using other appropriate benzocycloheptapyridoisoquinolines of formula I in which $R^3$ and $R^4$ together are oxo and the appropriate lower alkyl magnesium halide or lithium derivative, the corresponding A and B isomers of the corresponding compounds of formula I in which $R^3$ is lower alkyl and $R^4$ is hydroxy are obtained. For example, the A and B isomers of 4,7-dimethyl-1,4,5,6,6a,10,11,15b-octahydro-3H-benzo[6,7]cyclohepta[1,2,3-de]pyrido[2,1-a]isoquinolin-4-ol are obtained in the same manner from the A and B isomers of 7-methyl-4-oxo-1,4,5,6,6a,10,11,15b-octahydro-3H-benzo[6,7]cyclohepta[1,2,3-de]pyrido[2,1-a]isoquinoline and methyl magnesium iodide; and the A and B isomers of 4-ethyl-9-trifluoromethyl-1,4,5,6,6a,10,11,15b-octahydro3H-benzo[6,7]cyclohepta[1,2,3-de]pyrido[2,1-a]isoquinolin4-ol are obtained from the A and B isomers of 4-oxo-9-trifluoromethyl 1,4,5,6,6a,10,11,15b-octahydro-3H-benzo[6,7]cyclohepta[1,2,3-de]pyrido[2,1-a]isoquinoline.

We claim:

1. A process for preparing a compound of the formula:

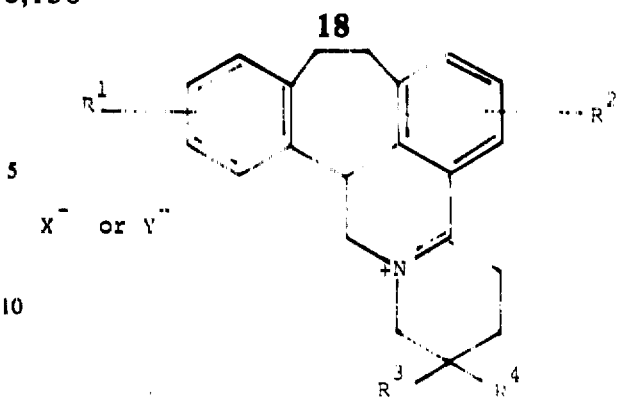

in which $R^1$ and $R^2$ are the same or different, selected from the group consisting of hydrogen, lower alkyl, lower alkoxy, trifluoromethyl, and halo; X and Y are selected from the group consisting of chlorine, bromine, iodine, methylsulfonyloxy, phenylsulfonyloxy and p-toluenesulfonyloxy; $R^3$ is hydrogen or lower alkyl, and $R^4$ is hydrogen or protected hydroxyl of formula $OR^5$, wherein $R^5$ is selected from the group consisting of tetrahydropyran-2-yl, (α-ethoxy)ethoxy, t-butyl, trityl, acetyl, p-methoxybenzyl, propionyl, and benzyl, or $R^3$ and $R^4$ together represent an alkylenedioxy group having from two to four carbon atoms, comprising the step of reacting a compound of the formula

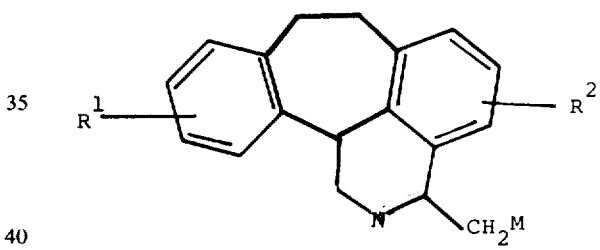

in which $R^1$ and $R^2$ are as defined herein and M is an alkali metal, selected from the group consisting of lithium, sodium or potassium, with a compound of formula $XCH_2CR^3R^4CH_2Y$, wherein X and Y are the same or different and selected from the group defined above; $R^3$ and $R^4$ as defined herein, and wherein the reaction is initiated at a temperature between −80°C and 20°C.

* * * * *

UNITED STATES PATENT AND TRADEMARK OFFICE
CERTIFICATE OF CORRECTION

PATENT NO. : 3,896,130
DATED : July 22, 1975
INVENTOR(S) : Drs. Philipp, Humber, Bruderlein and Gotz It is certified that error appears in the above-identified patent and that said Letters Patent are hereby corrected as shown below:

Inventors: "for Adolf H. Phillipp" read --Adolf H. Philipp--,

Column 5, line 50, for "levele" read --level--,

Column 6, line 25, for "Alsos," read --Also,--,

Column 6, line 33, for "pyrido[2,1a]-" read --pyrido[2,1-a]--,

Column 9, line 15, for "idepyridine" read --ide-pyridine--,

Column 9, line 53, for "pyridine(2(.)." read --pyridine (1 1.).--,

Column 13, line 49, for "7]cycloheptal[1,2,3-de]pyrido[2']-isoquinolinium" read --7]cyclohepta[1,2,3-de]pyrido[2,1-a]-isoquinolinium--, Column 13, line 57, for "zo[6,-" read --zo[6,7- --, Column 14, line 3, for "zo[6,-" read --zo[6,7- --,

UNITED STATES PATENT AND TRADEMARK OFFICE
CERTIFICATE OF CORRECTION

PATENT NO. : 3,896,130
DATED : July 22, 1975
INVENTOR(S) : Drs. Philipp, Humber, Bruderlein and Gotz It is certified that error appears in the above-identified patent and that said Letters Patent are hereby corrected as shown below:

Column 15, line 30, for "cycloheptal[1,2,3-" read --cyclohepta-[1,2,3- --,

Column 15, line 40, for "]isoquinolin-4-ol," read --a]isoquinolin-4-ol,--,

Column 16, line 5, for "trithylamine" read --triethylamine--,

Column 16, line 30, for "de]purido[2,1-a]isoquinol-4-ol" read --de]pyrido[2,1-a]isoquin-4-ol-- and Column 17, line 18, for "column, wit pet. Ether-" read --column with pet. ether- --.

Signed and Sealed this twentieth Day of April 1976

[SEAL]

Attest:

RUTH C. MASON
Attesting Officer

C. MARSHALL DANN
Commissioner of Patents and Trademarks